(12) United States Patent
Pagano

(10) Patent No.: US 6,192,200 B1
(45) Date of Patent: Feb. 20, 2001

(54) FILM CASSETTE HAVING MEMORY MODULE, PHOTOGRAPHIC DEVICE, AND METHOD FOR REGISTERING MEMORY MODULE

(75) Inventor: Daniel M. Pagano, Honeoye Falls, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/221,660

(22) Filed: Dec. 23, 1998

(51) Int. Cl.[7] .............................. G03B 7/24; G03B 17/02
(52) U.S. Cl. ............................................. 396/208; 396/538
(58) Field of Search ................................... 396/207, 208, 396/211, 321, 538

(56) References Cited

U.S. PATENT DOCUMENTS

| 5,032,855 | 7/1991 | Taniguchi et al. . |
| 5,349,401 | 9/1994 | Bryant . |
| 5,394,206 | 2/1995 | Cocca . |
| 5,526,084 | 6/1996 | Kataoka et al. . |
| 5,608,485 | 3/1997 | Kataoka et al. . |
| 5,701,530 | * 12/1997 | Fujino .................. 396/311 |
| 5,710,617 | 1/1998 | Inuiya . |

\* cited by examiner

Primary Examiner—David M. Gray
(74) Attorney, Agent, or Firm—Robert Luke Walker

(57) ABSTRACT

A photographic device includes a film cassette that has a shell having a film space and a module slot external to the film space. The filmstrip coiled within said film space. A memory module is loosely retained in the module slot. The photographic device has a terminal block that orients and holds the memory module when the film cassette is loaded.

28 Claims, 8 Drawing Sheets

FILM CASSETTE HAVING MEMORY MODULE, PHOTOGRAPHIC DEVICE, AND METHOD FOR REGISTERING MEMORY MODULE

FIELD OF THE INVENTION

The invention relates to photography and more particularly relates to a film cassette having a memory module, photographic device, and method for registering the memory module.

BACKGROUND OF THE INVENTION

In order to better record ancillary information about captured images, some film cassettes have an internal electronic memory, which is written to by a microprocessor in a camera. Good electrical contact must be maintained in the camera between a series of fixed contacts on the memory and a series of leads in the camera. To reduce overall camera and film cassette size, the parts involved are quite small. Misalignment easily occurs unless all parts are precisely made.

It would thus be desirable to provide an improved film cassette having memory module, photographic device, and method in which the memory module can partially self-align.

SUMMARY OF THE INVENTION

The invention is defined by the claims. The invention, in its broader aspects, provides a photographic device that includes a film cassette that has a shell having a film space and a module slot external to the film space. The filmstrip coiled within said film space. A memory module is loosely retained in the module slot. The photographic device has a terminal block that orients and holds the memory module when the film cassette is loaded.

It is an advantageous effect of at least some of the embodiments of the invention that an improved film cassette having memory module, photographic device, and method in which the memory module can partially self-align.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 11–12 show the relative movement of the memory module as the cassette is inserted into the cassette station. In FIG. 11, the locator and cam unit have not yet come into contact. In FIG. 12, the cam surfaces and locator surfaces have started to engage, reorienting the memory module.

DETAILED DESCRIPTION OF THE INVENTION

Figure 1:
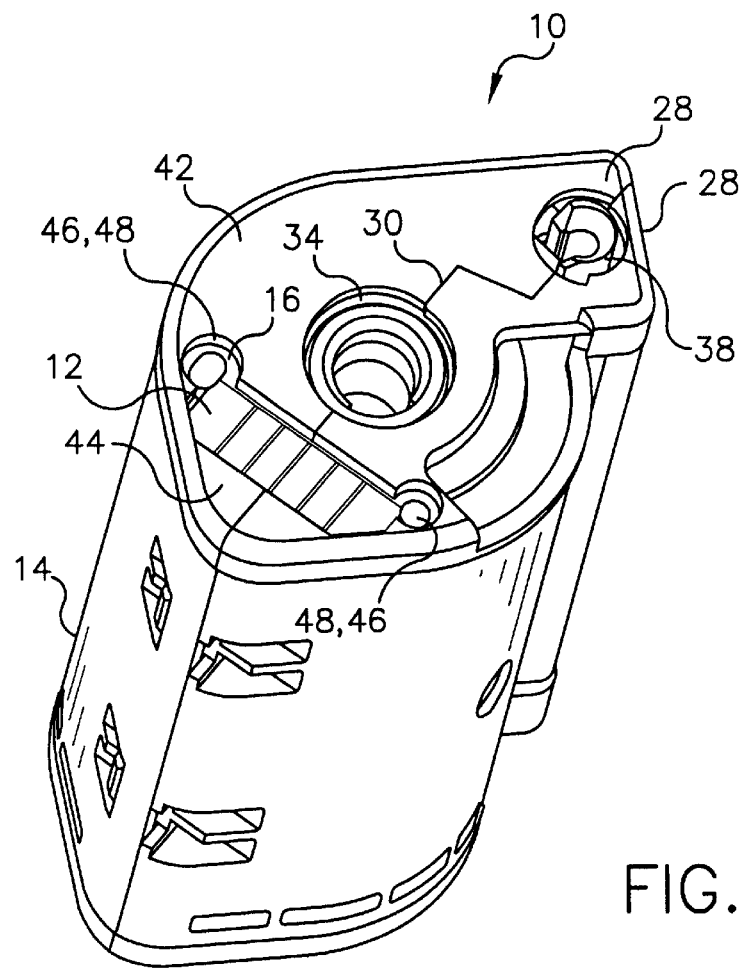
FIG. 1 is top perspective view of an embodiment of the film cassette.
Figure 2:
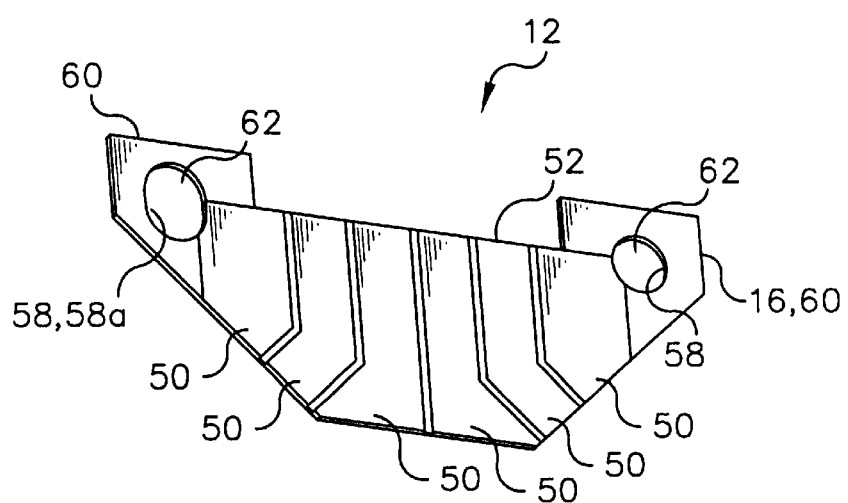
FIG. 2 is a top perspective view of the memory module of the film cassette of FIG. 1.
Figure 3:
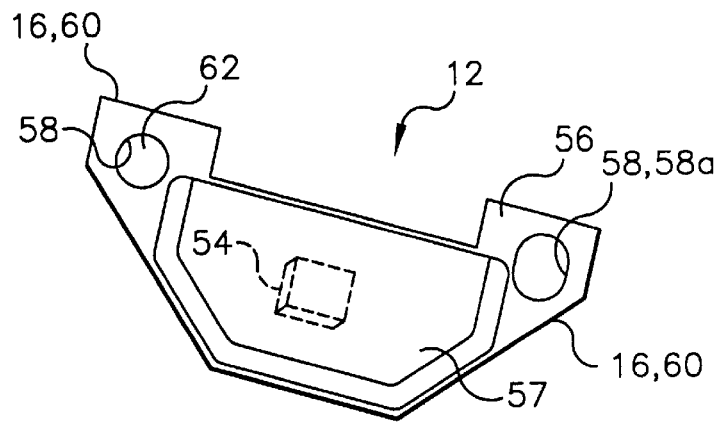
FIG. 3 is a bottom perspective view of the memory module of the film cassette of FIG. 1. The location of an electronic component is indicated by a dashed line.
Figure 4:
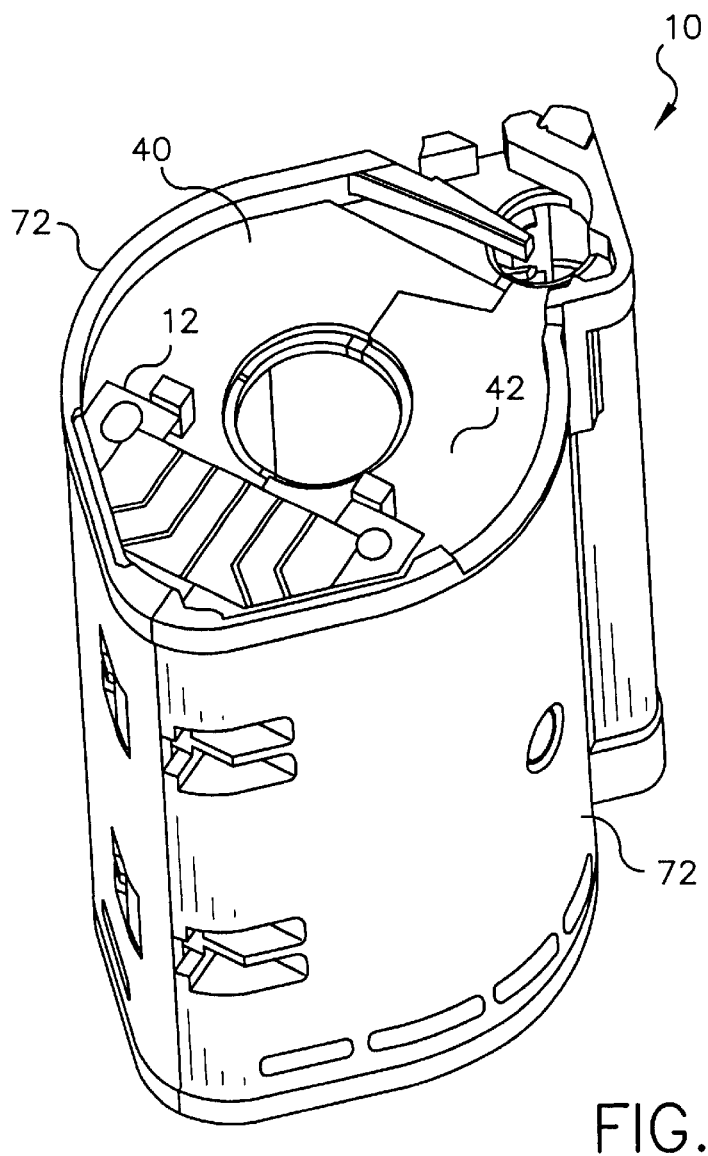
FIG. 4 is a top perspective of the film cassette of FIG. 1. The top end of the shell is deleted to show the position of the memory module in the slot.
Figure 5:
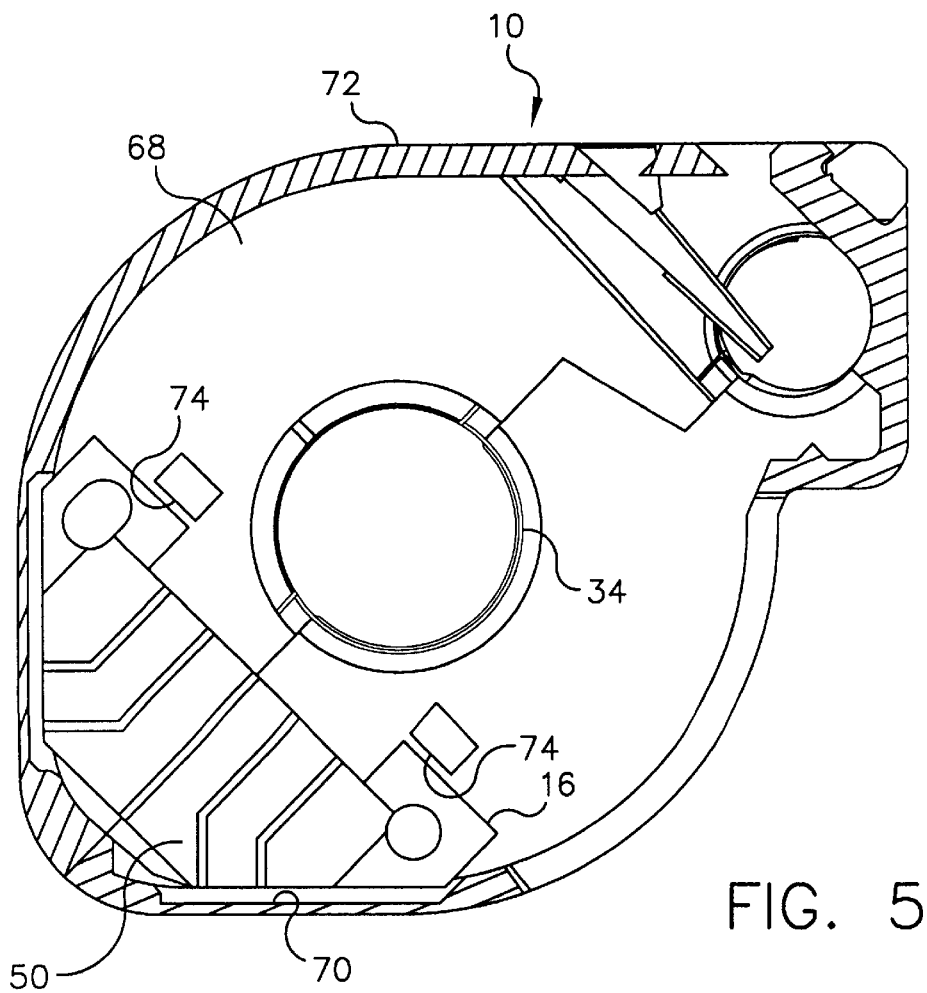
FIG. 5 is a top plan view of the film cassette of FIG. 4. The top end of the shell is deleted to show the position of the memory module in the slot.
Figure 6:
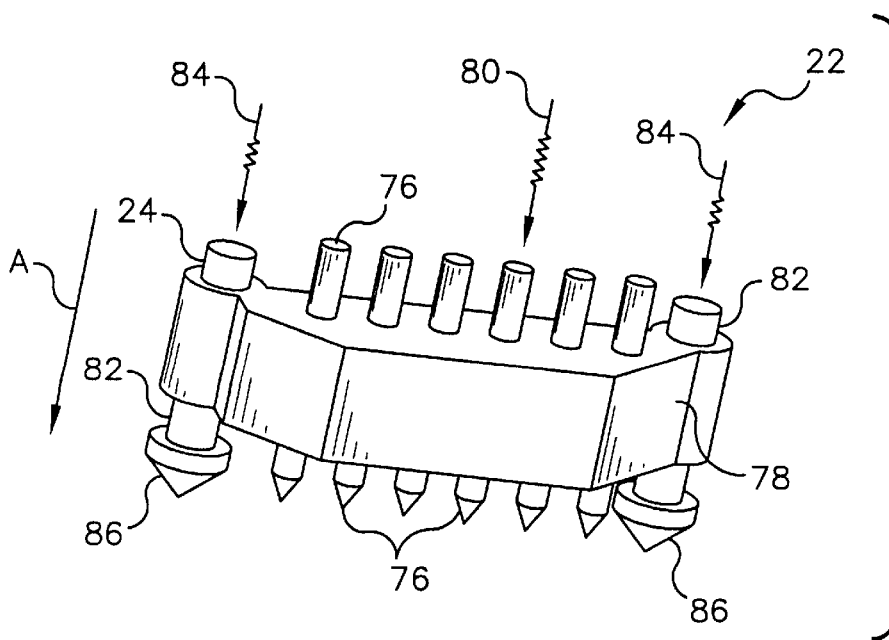
FIG. 6 is a perspective view of the terminal block of the film device.

A film cassette 10 has a memory module 12 that floats within the shell 14 of the cassette 10. The memory module 12 has a locator 16. A photographic device 18 receives the film cassette 10 in a cassette station 20. The cassette station 20 includes a terminal block 22 that has a cam unit 24. When the film cassette 10 is loaded in the cassette station 20, the locator 16 and cam unit 24 are in engagement, and the memory module 12 is held in place relative the photographic device 18 and the cassette shell 14.

Referring now primarily to FIGS. 1–5 and 13, a filmstrip 26 is coiled within the shell 14. The film cassette 10 is illustrated as being similar in configuration to an Advanced Photo System™ film cassette. As shown in FIG. 1, the shell 14 is made from two halves 28 that are joined together along an irregular midline 30. The film cassette 10 is not limited to any particular configuration. For example, the film cassette 10 can resemble a Type 135 cassette or a two chambered cassette, such as Type 110. The film cassette 10 holds the filmstrip 26 in a film space 32, coiled about a spool 34. The coiled filmstrip 26 defines a cassette axis 36 about which the spool 34 rotates. The film space 32 is preferably able to hold the filmstrip 26 light-tight. In the film cassette 10 shown in FIG. 1, the film cassette 10 includes an active light lock 38 that is rotated to open and close an exit (not shown) for the filmstrip 26.

The shell 14 holds the memory module 12 in a module slot 40 that is separate and external from the film space 32 and not light-tight. The shell 14 has an end wall 42 having a terminal opening 44 that communicates with the module slot 40 over the memory module 12. The module slot 40 can be located in any part of the cassette 10, but it is currently preferred that the terminal opening 44 opens outward from one of the axial ends of the cassette 10. The end wall 42 of the cassette shell 14 has a locating port 46 having a pair of locator-cam passages 48 that adjoin and are coplanar with the terminal opening 44.

The memory module 12 is roughly planar and has an array of electrical contacts 50 on an upper surface 52 and one or more electronic components 54, such as an integrated circuit chip on a lower surface 56. The memory module 12 can be a printed circuit board to which the components 54 are surface mounted or otherwise affixed. It is preferred that the component or components 54 are embedded in plastic potting or the like to provide a smooth pad 57 or that other measures are taken to ensure that the lower surface 56 does not bind against the shell 14. The memory module 12 has a locator 16 that includes one or more locating surfaces 58. In the memory module 12 shown in the figures, the locator 16 has a pair of opposed subunits 60, which extend outward like ears from the remainder of the memory module 12. Each subunit 60 has an opening 62. The margins of the openings 62 form the locating surfaces 58. One of the locating surfaces 58 is oval in shape; the other locating surface 58 is circular.

The memory module 12 is loosely retained in the module slot 40 and is free to move in a plane perpendicular to the cassette axis 36. (This plane is indicated by the reference numeral 66 in FIG. 13 and is hereafter also referred to as "radial plane 66". The respective end wall 42 of the cassette 10 and an inner wall 68 limit the axial dimension of the module slot 40 to no more clearance than is necessary for free movement of the memory module 12. The movement of the memory module 12 in the radial plane 66 is limited by primary bumpers 70 formed in the circumferential wall 72 of the shell 14 and secondary bumpers 74 extending upward from the inner wall 68. The bumpers 72, 74 are positioned to limit the range of motion of the memory module 12 in the radial plane 66 such that the locating surfaces 58 remain, at all times, in at least partial axial alignment with the locator-cam passages 48. This ensures that the cam unit 24 (discussed in detail below) must touch the locating surfaces 58 when the cam unit 24 enters the locator-cam passages 48.

Referring now primarily to FIGS. 6–12 and 14, the terminal block 22 has an array of leads 76, the cam unit 24, and a support structure 78. In the embodiment shown in the figures, the leads 76 are parallel spaced apart pins that are urged by springs (symbolized in FIG. 6 by item 80) in the direction indicated by arrow "A". The cam unit 24 has a pair of opposed cams 82 that are aligned with the leads 76 and are separately spring biased in the direction "A" by springs 84. The leads 76 are conductive and are spaced to electrically contact individual contacts 50 of the memory module 12. The cams 82 are preferably non-conductive. The cams 82 each have a conical cam surface 86 that narrows in the direction of arrow "A". In the embodiment shown in the figures, the cam surfaces 86 each have the shape of a regular circular cone.

Figure 9:
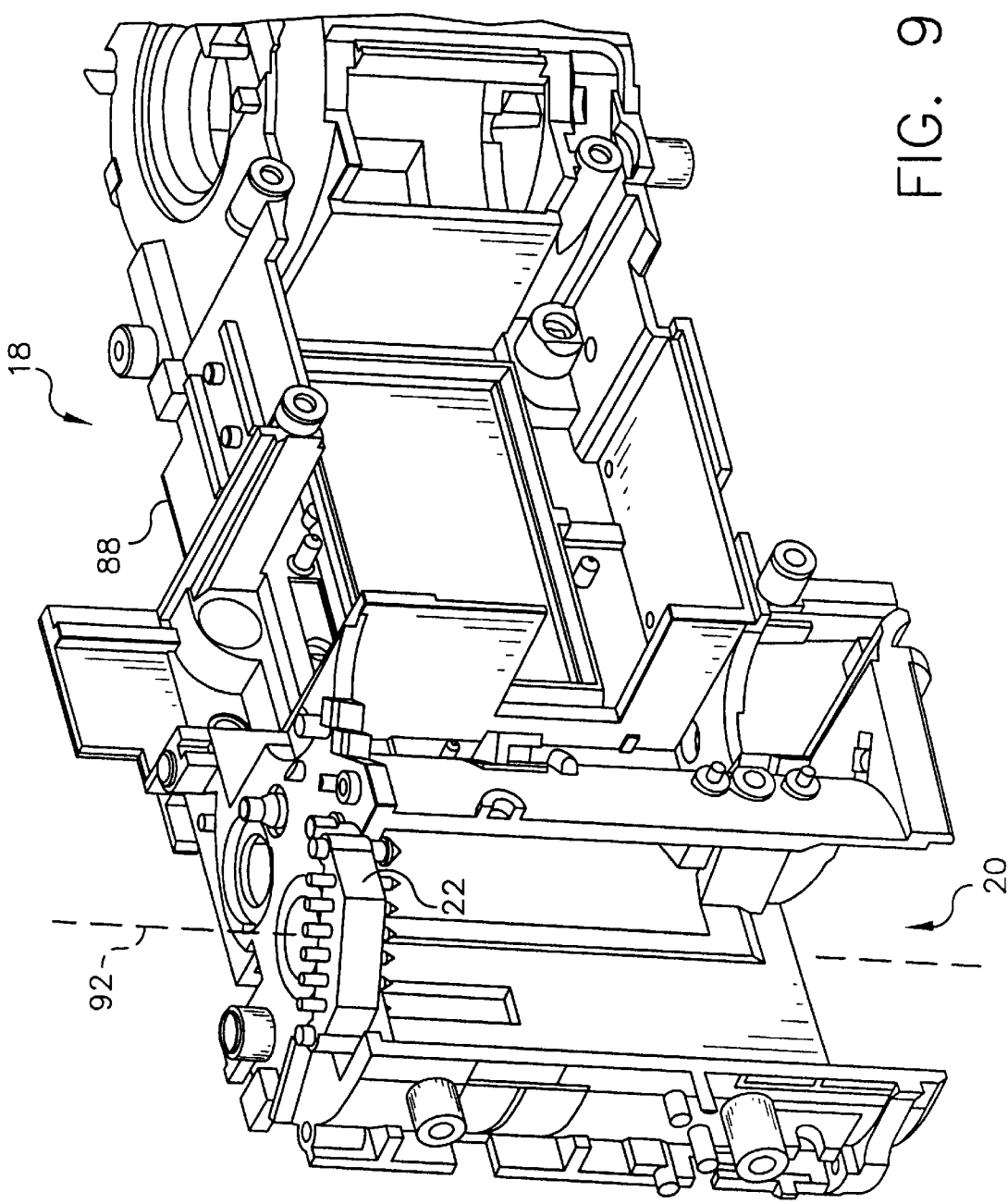
FIG. 9 is a partial front perspective view of a film device, in this case a camera, that includes the terminal block of FIG. 6. The frame of the camera is shown. The body and some other camera components are deleted for clarity.
Figure 10:
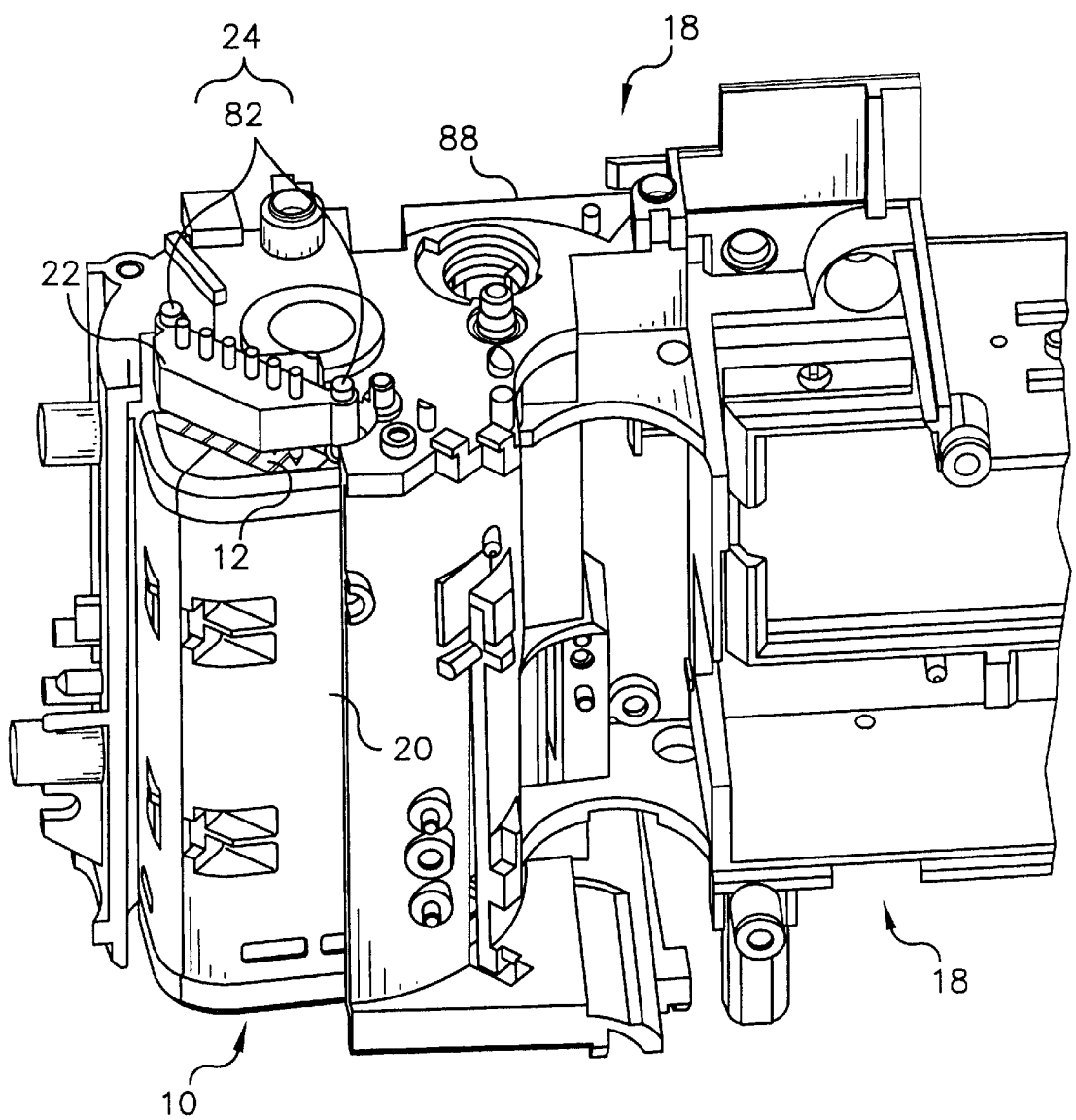
FIG. 10 is an enlarged, partial front perspective view of the camera of FIG. 9. The film cassette of FIG. 1 is shown within a cassette chamber. The terminal block is seated on the memory module of the film cassette.

The photographic device 18, which can be a camera or another device that uses film, has a body 88 that includes the cassette station 20. The cassette station 20 is configured to receive the film cassette 10 in a predetermined, fixed orientation. A film transport 90 is positioned in the body 88 to move the filmstrip 26 into or both into and out of the shell 14. The body 88 of a suitable camera 18 is shown in FIGS. 9–10. (For clarity, only the frame is illustrated.) The film cassette 10 is axially loaded and has a fixed rotational position within the station 20 within narrow tolerances. When loaded the axis 36 of the film cassette 10 is coextensive with an axis 92 of the station 20. The terminal opening 44 is located in a predetermined, standardized location on the shell 14; thus, when the cassette 10 is loaded in the station 20, a site 94 in the station 20 for the locator-cam passage 48 is defined. The terminal block 22 is mounted in the body 88 in the cassette station 20 in alignment with the locator-cam passage 48 site 94. The springs bias the leads 76 and cam unit 24 toward engagement with the memory module 12. The terminal block 22 defines an orientation for the memory module 12 on the radial plane 66.

Figure 7:
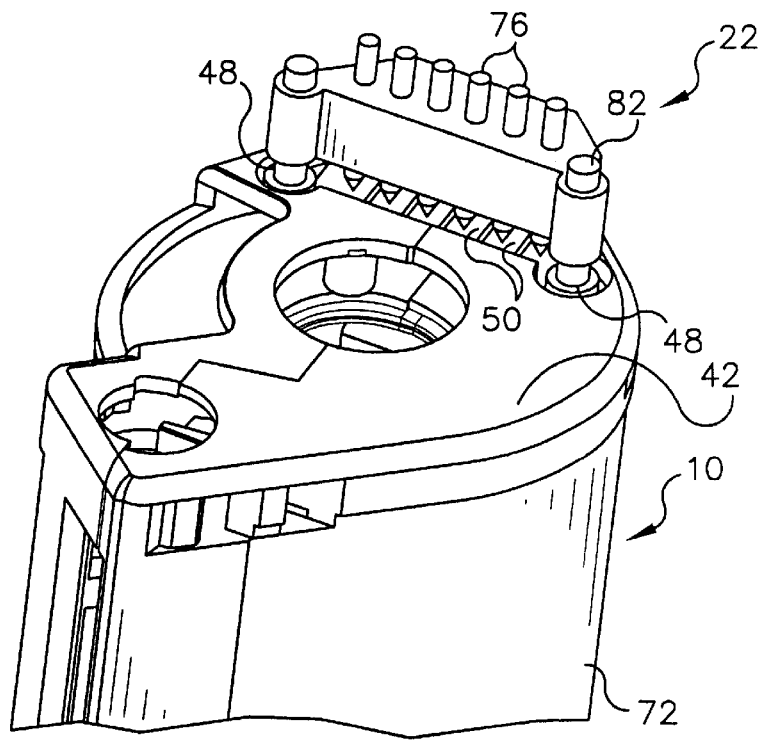
FIG. 7 is a partial perspective view of the terminal block of FIG. 6 seated on the film cassette of FIG. 1.
Figure 8:
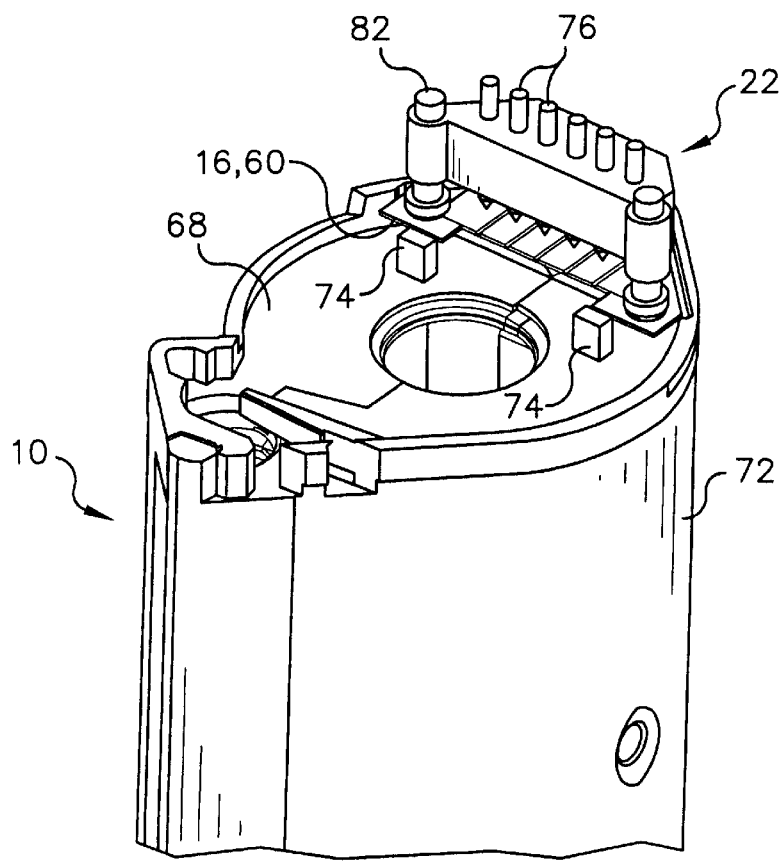
FIG. 8 is substantially the same view as FIG. 7, except the top end of the shell of the cassette is deleted to show the position of the memory module.
Figure 11:
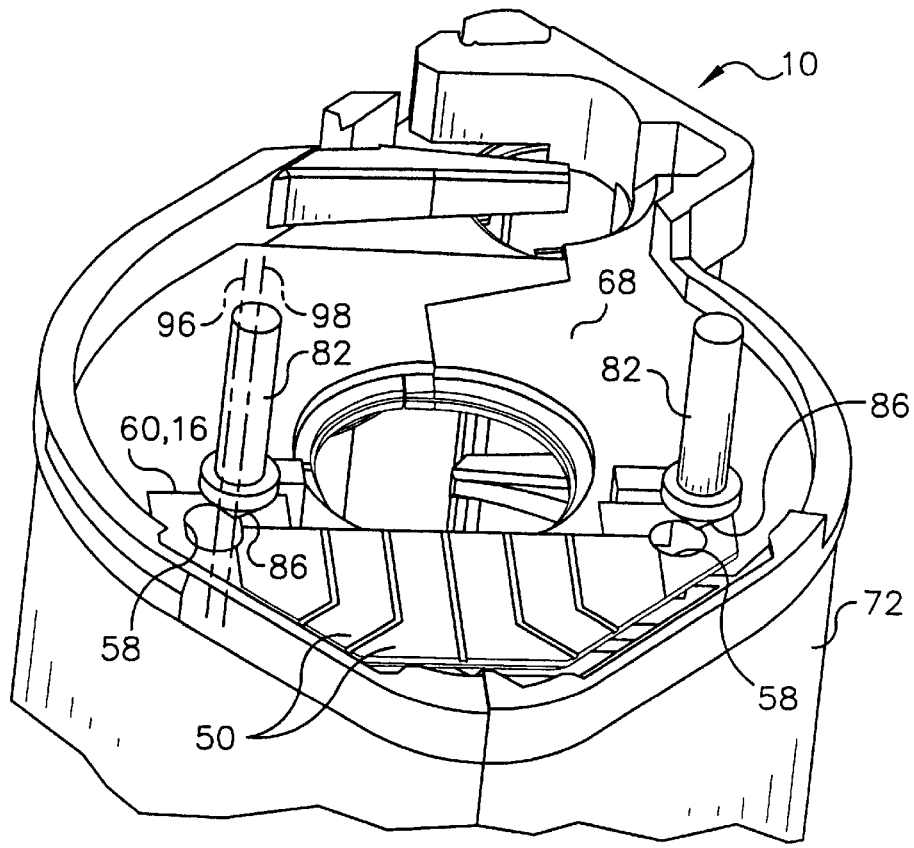
FIGS. 11–12 are top perspective views of the film cassette of FIG. 1 and the cam unit of the terminal block of FIG. 6.
Figure 12:
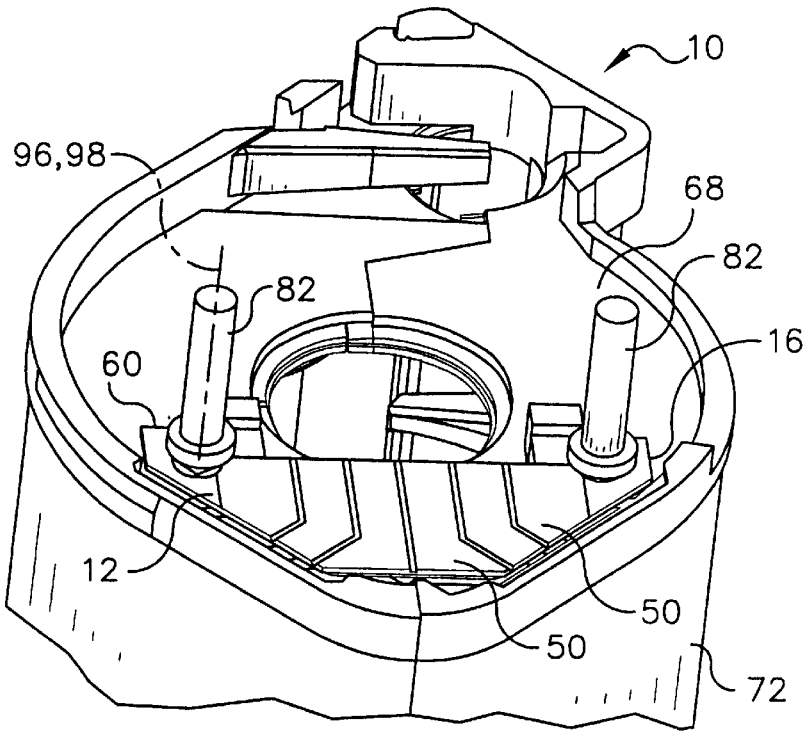
Figure 13:
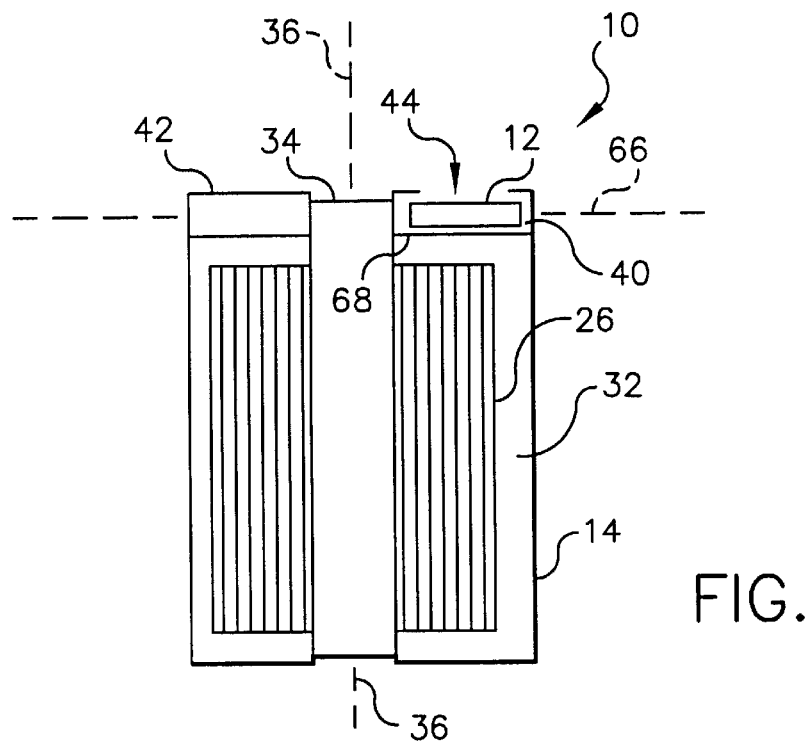
FIG. 13 is a semi-diagrammatical cross-section of the film cassette of FIG. 1.
Figure 14:
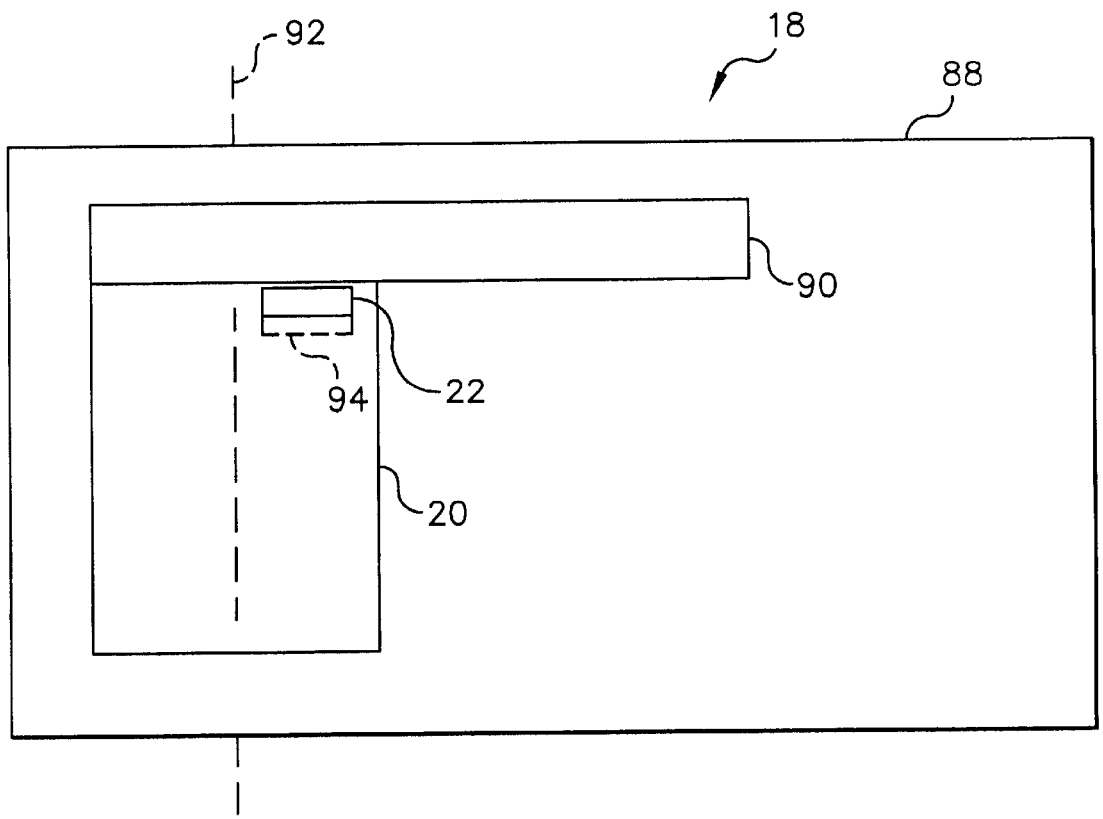
FIG. 14 is a photographic device of the invention.

Referring now primarily to FIGS. 11–12 and 7, in the method of the invention, the film cassette 10 is loaded into the cassette station 20 and assumes the predetermined cassette orientation. The locator 16 and cam unit 24 are moved relative to each other until the locating surfaces 58 and cam surfaces 86 touch. Further relative movement causes the memory module 12 to pivot within the module slot 40 until a locating axis 96 centered in the oval locating surface 58a and parallel to the cassette axis 36, comes into alignment with a camming axis 98 centered in the adjoining cam surface 86. The camming axis 98 is also parallel to the cassette axis 36. When fully seated, by the biasing of the springs 80, 84, the terminal block 22 is registered with the memory module 12, as shown in FIG. 7, and the leads 76 and contacts 50 are held together, in alignment. Further rotation of the memory module 12 is arrested, until the film cassette 10 is removed from the device 18. In the embodiments shown in the figures, the cam surfaces 86 are conical and the locating surfaces 58 are the margins of openings. Other shapes can be provided for these surfaces as long as the combination of cam surfaces 86 and locating surfaces would result in the described reorientation of the memory module in the module slot.

The invention has been described in detail with particular reference to certain preferred embodiments thereof, but it will be understood that variations and modifications can be effected within the spirit and scope of the invention.

What is claimed is:

1. A film cassette comprising:
    a shell having a light-tight film space and a module slot external to said film space;
    a filmstrip coiled within said film space;
    a memory module disposed in said module slot, said memory module being both retained within said module slot and movable within said module slot.

2. The film cassette of claim 1 wherein said shell has a locating port communicating with said module slot and a terminal opening communicating with said module slot and adjoining said locating port, said memory module has a locator and an array of contacts, and said memory module is movable, within said module slot, into a position aligning said locator and said locating port and aligning said array of contacts and said terminal opening.

3. The film cassette of claim 1 wherein said memory module is bounded by said shell in first, second, and third orthogonal directions, said memory module being bounded by said shell in said first and second orthogonal directions more loosely than in said third orthogonal direction.

4. The film cassette of claim 1 wherein said filmstrip defines a cassette axis and said terminal opening faces axially outward from said shell.

5. The film cassette of claim 3 wherein said filmstrip defines a cassette axis and said third orthogonal direction is axial.

6. The film cassette of claim 2 wherein said locator has a pair of opposed locating surfaces and said locating port has a pair of passages, each said passage adjoining said terminal opening.

7. The film cassette of claim 1 wherein said memory module has a locator having a pair of locating surfaces, one of said locating surfaces having an oval shape and the other of said locating surfaces having a circular shape.

8. The film cassette of claim 7 wherein said locating surfaces are margins of holes in respective said subunits.

9. The film cassette of claim 1 wherein said film space is disposed in light-tight relation to said module slot.

10. The film cassette of claim 1 wherein said memory module has a locator and said shell has a locator port communicating with said module slot and said memory module is retained in said module slot wherein said locator is continuously in at least partial alignment with said locator port.

11. The film cassette of claim 1 wherein said memory module has a locator having a pair of holes and said shell has a pair of passages communicating with said module slot and said memory module is retained in said module slot wherein said holes are each continuously in at least partial alignment with the respective said passage.

12. The film cassette of claim 11 wherein one of said holes has an oval shape and the other of said holes has a circular shape.

13. A photographic device for use with a photographic film cassette having a retained, movable memory module with a locator, said photographic device comprising:
   a body having a cassette station, said cassette station defining a site for said locator;
   a film transport disposed in operative relation to said cassette station;
   a terminal block disposed in said cassette station, said terminal block being biased toward said locator site, said terminal block including a plurality of leads and a non-conductive cam unit having at least one cam surface, said cam unit being aligned with said locating opening site.

14. The device of claim 13 wherein said cam unit includes a pair of spaced apart cams, each said cam having a cam surface.

15. The device of claim 14 wherein said cams are resiliently biased toward said locating opening site.

16. The device of claim 13 further comprising a film cassette including:
   a shell having a film space, a module slot external to said film space, and a terminal opening communicating with said module slot;
   a filmstrip coiled within said film space;
   a memory module disposed in said module slot, said memory module being both retained within said module slot and movable within said module slot, said memory module having a plurality of contacts and a locator, said locator being in engagement with said cam unit.

17. The device of claim 16 wherein said cam unit is resiliently biased against said locator.

18. The device of claim 16 wherein said cassette station defines a station axis and said memory module is arrested and rotationally oriented relative to said axis by said cam unit.

19. The device of claim 16 wherein said terminal opening faces axially outward from said shell.

20. The device of claim 16 wherein said cam unit includes a pair of spaced apart cams, each said cam having a cam surface; and said locator has a pair of opposed subunits, each said subunit having a locating surface.

21. The device of claim 20 wherein said cam surfaces are resiliently biased against said locating surfaces.

22. The device of claim 14 wherein said leads and said cams are resiliently biased separately.

23. A method for registering a memory module in a module slot of a film cassette, comprising the steps of;
   loading the film cassette in a cassette station, said cassette station defining a cassette orientation and a module orientation;
   holding said film cassette in said cassette orientation;
   during said holding, pivoting the module within the module slot into said module orientation.

24. The method of claim 23 further comprising, during said holding engaging a plurality of leads of said cassette station and a plurality of contacts of said film cassette.

25. A film cassette comprising:
   a shell defining a light-tight film space and a module slot external to said film space;
   a filmstrip coiled within said film space;
   a memory module permanently retained in said module slot by said shell, said memory module being movable within said module slot.

26. The film cassette of claim 25 wherein said memory module has an array of electrical contacts and a pair of locator subunits, and said shell has a pair of passages communicating with said module slot and a single terminal opening disposed over said memory module, said terminal opening adjoining said passages.

27. The film cassette of claim 25 wherein said memory module has a locator and said shell has a locator port, and said locator is continuously disposed in at least partial alignment with said locator port.

28. The film cassette of claim 27 wherein said shell includes a circumferential wall, an end wall and an inner wall bounding said module slot, said inner wall being disposed between said module slot and said film space, said end wall having said locator port.

* * * * *